United States Patent [19]

Ackeret

[11] 4,106,401
[45] Aug. 15, 1978

[54] HAND-OPERATED SQUEEZER FOR EXTRACTING THE JUICE FROM CITRUS FRUITS

[75] Inventor: Peter Ackeret, Kusnacht, Switzerland

[73] Assignee: Zyliss Zysset AG, Lyss, Switzerland

[21] Appl. No.: 730,198

[22] Filed: Oct. 6, 1976

[30] Foreign Application Priority Data

Aug. 6, 1976 [DE] Fed. Rep. of Germany ....... 2635503

[51] Int. Cl.² .......................... A23N 1/00; A47J 19/02
[52] U.S. Cl. ........................................... 99/508; 99/506
[58] Field of Search ................... 99/501, 503, 505–508, 99/513; 100/112, 213; 210/413–414

[56] References Cited

U.S. PATENT DOCUMENTS

| 1,194,737 | 8/1916 | Holden | 99/508 |
| 3,566,939 | 2/1969 | Hubrich | 99/501 |

Primary Examiner—Harvey C. Hornsby
Assistant Examiner—Robert Pous
Attorney, Agent, or Firm—H. Dale Palmatier

[57] ABSTRACT

A citrus fruit squeezer having upstanding squeezer cones above a strainer and receptacle, the cones being symmetrically arranged for simultaneous use by a person with both hands.

25 Claims, 13 Drawing Figures

HAND-OPERATED SQUEEZER FOR EXTRACTING THE JUICE FROM CITRUS FRUITS

This invention relates to a hand-operated squeezer for extracting the juice from citrus fruits.

Known commercial citrus fruits squeezers comprise in general a squeezer member, in the shape of approximately a half ellipsoid (referred to in the following as a "cone" or as "conical" to simplify matters), which has ribs on one surface, and also juice-collecting dishes and/or strainers for retaining the flesh of the fruit squeezed out with the juice. The halves of the piece of fruit from which the juice is to be extracted are pressed on these squeezer members with one hand and twisted relative to the cone. In the case of motor-driven squeezers, the cone rotates.

The forces occurring during the squeezing make it necessary to hold the squeezer tightly with the other hand, to prevent twisting, slipping away or even tipping up of the squeezer.

From fruit squeezers used mainly in industry, it is known to increase the efficiency of the squeezing by arranging a plurality of identical squeezer members. With these squeezers, the halves of the fruit are guided onto the cones by means of very complicated additional devices, the squeezing process is effected and the squeezed fruit halves removed. The considerable technical resources and the very high cost of manufacturing such mechanical squeezers are not in keeping with their useful effect, so that from the start they are not suitable for household purposes.

Hand-operated squeezers are furthermore known in which cones of different sizes are arranged next to one another, or larger cones may be placed on smaller cones to accommodate different sized fruit, for example, grapefruit on the one hand and lemons on the other.

As regards the sequence of the operation, all the known hand-operated squeezers have in common the fact that first of all the fruit is halved, then one half of the piece of fruit is put down somewhere, whilst the other half is squeezed, and subsequently the second half is squeezed.

The present invention has now taken as its basis the concept of making both hands available for the manual squeezing of halves of fruit without the one hand having to hold the apparatus firmly, and by this means increasing the possible output of a hand-operated squeezer in juice squeezed out by double the amount over the same period of time, without the manufacturing costs of squeezers of this kind being markedly increased with respect to the conventional hand-operated squeezers.

To solve this problem the invention consists in that the hand-operated squeezer has at least one pair of squeezer members, of the same size and shape, and the squeezer members of each pair are so arranged with respect to one another that they may be used for the simultaneous squeezing, with both hands, of fruit halves of approximately the same size with approximately the same expenditure of force and in the same time, and the forces occurring upon simultaneous squeezing of two fruit halves on the two squeezer members substantially cancel each other out.

The two squeezer members (cones) may be used conveniently at the same time since the squeezer does not need to be held firm during this squeezing operation as the reaction moments of rotation, irrespective of whether rotation is effected in opposite directions or in the same direction, offset each other at least partially, and thus the squeezer is not moved out of its position during squeezing with both hands.

In its simplest case, the squeezer has only one pair of cones. If an adaptation to fruit of different size is to be effected, then two or more pairs of cones are provided.

Several embodiments of a hand-operated squeezer, each constructed in accordance with the invention, will now be described, by way of example, with reference to the accompanying drawings, in which.

Figure 1:
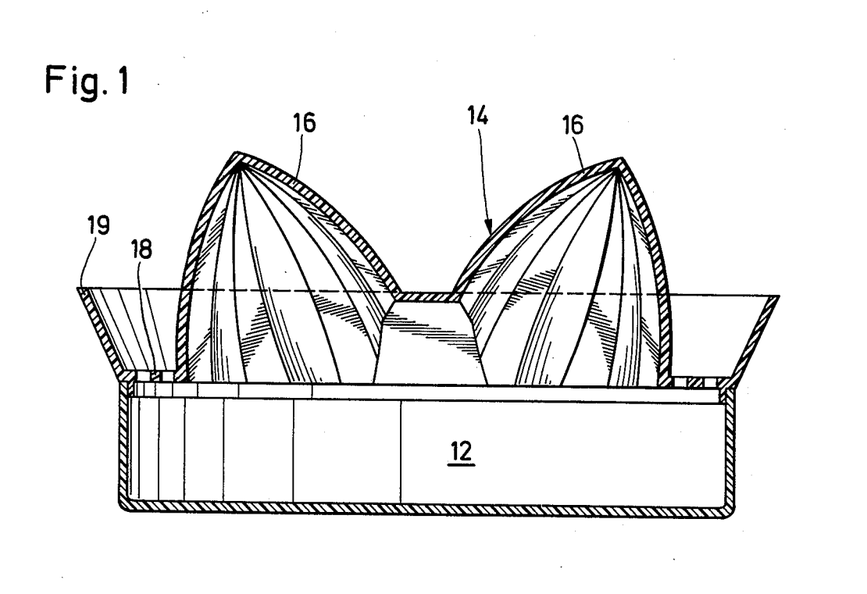
FIG. 1 shows a first embodiment in section through the axes of both cones.
Figure 2:
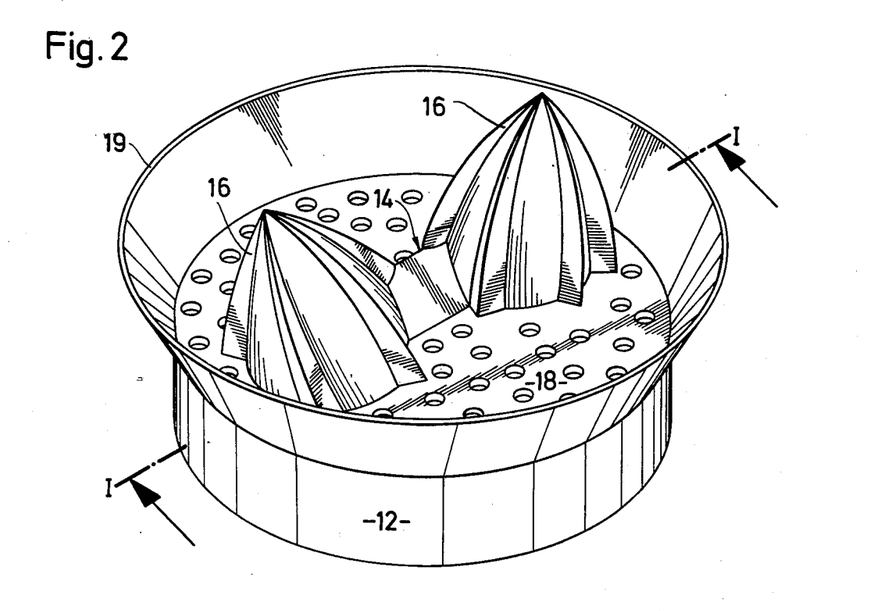
FIG. 2 is a perspective illustration of the embodiment of FIG. 1.

Referring to the drawings, the hand-operated squeezer shown in FIGS. 1 and 2 is constructed in two parts. On a circular juice-collecting dish 12 there is a one-piece moulded or injection-moulded plastics part 14 consisting of two squeezer members (cones) 16 and a strainer 18 surrounding the support for the cones, which strainer is delimited at its perimeter by an upturned rim 19. The axes of the cones 16 lie in a plane which, when the dish 12 is standing on a horizontal base, for example, a table, is vertical. The axes of the cones 16 define an angle of 30°. It has been shown that this position is the most favourable for the simultaneous usage with both hands. In the middle, the minimum distance between the two cones 16 is one centimeter, this distance being adequately large to give even two fruits with thick skins freedom to rotate. A larger distance would, on the other hand, only make the cost of material for the squeezer unnecessarily high. For this same reason part 14 is hollow.

The hand-operated squeezer of FIGS. 3 and 4 again consists of a dish 30 with a circular outline, the dish being provided with a pouring lip 32 and opposite to this a handle 34. On the upper rim of the dish 30 there rests a strainer 36. A bulge 38 of the strainer 36 engages in the pouring lip 32 and this prevents the strainer from rotating relative to the dish 30. At its centre the strainer base 40 carries a pin 42 on which a support 44 of a double cone member 46 is placed. The complementary cross-section of the pin 42 and of the support 44 are polygonal, for example, rectangular or hexagonal, so that the support rests on the pin so that it cannot rotate, but may still be removed.

Figure 3:
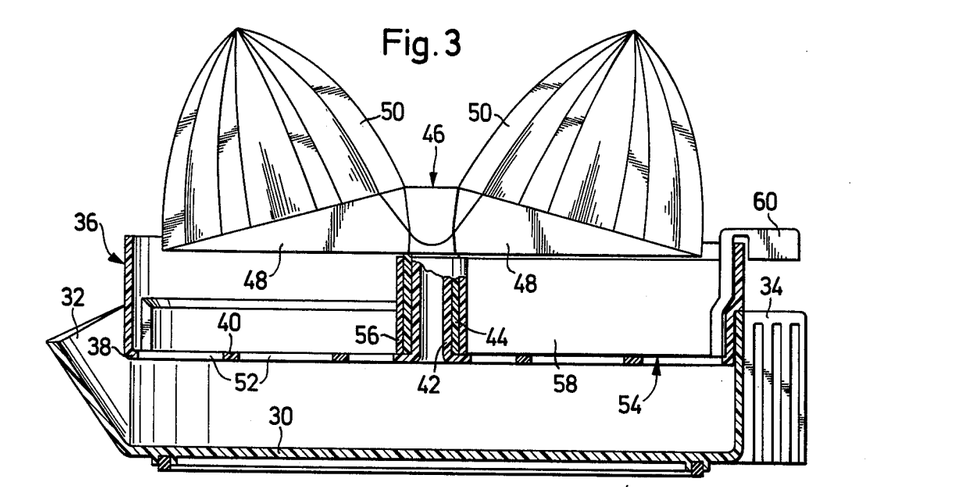
FIG. 3 illustrates a second embodiment in partially cut away side view.
Figure 4:
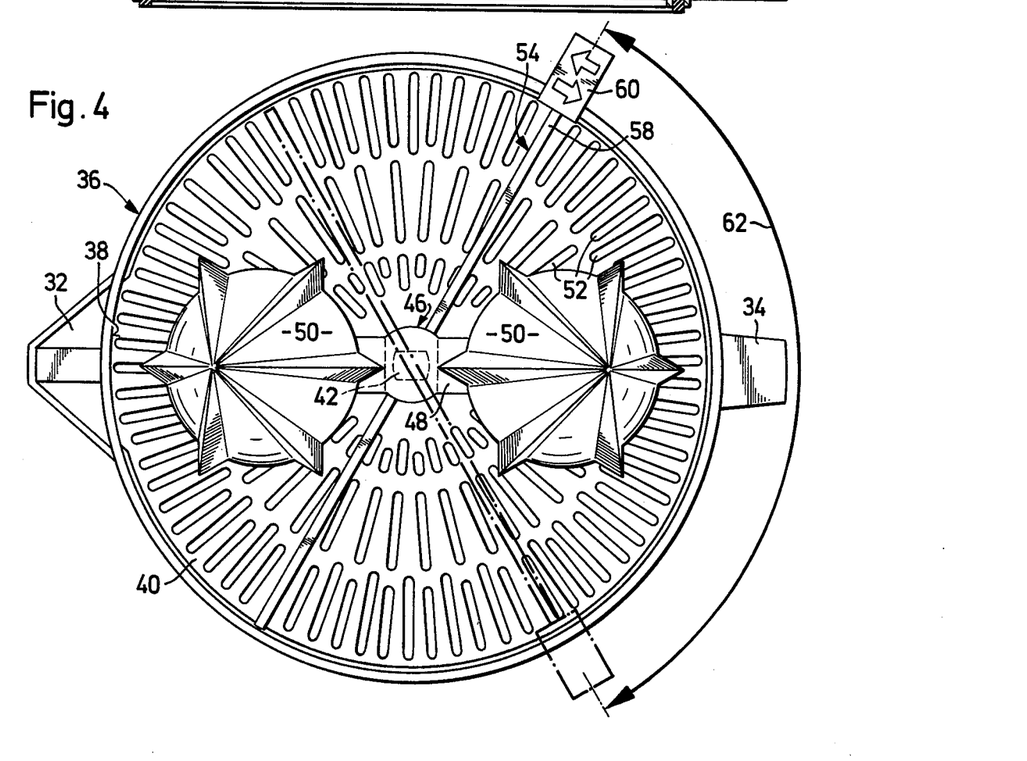
FIG. 4 shows the plan view of the embodiment of FIG. 3.

The double cone member 46 has a base 48 joining the support 44 and supporting the two cones 50 which are again inclined at an angle of about 30° with respect to one another. The compressive forces are transferred from the base 48 to the support 44 and from this to the strainer base 40 so that they are finally conveyed with certainty to the dish 30. Strainer openings 52 are constructed as radial slots, and the strainer base may slope outwards and downwards slightly (which is not apparent from the drawings).

The support 44 is cylindrical outside and serves as a pivot for a cleaning element 54. The cleaning element 54 has a central bearing casing 56, which may be rotated on the support 44, and to which there are joined radial cleaner bars 58. At one end of one bar 58 there is a tab 60. Stops (not shown) serve to restrict the rotary movement of the cleaning element 54 to the sector indicated by the arrow 62.

The cleaning element 54 serves to clear away the flesh of the fruit squeezed out with the juice from the strainer base 40 beneath the cones 50, that is, into the sectors between the cones. For this reason, this embodiment is especially suited to extracting the juice from large quantities of citrus fruit in quick succession, because the otherwise usual, troublesome cleaning of the residues from the strainer need be effected only when the juice has been extracted from a large quantity of fruit, for example, several kilograms. The strainer base 40 has strainer openings 52 in the sectors intended for depositing the waste flesh as well, so that the remainder of the juice still escaping from the flesh of the fruit can still drip down.

Figure 5:
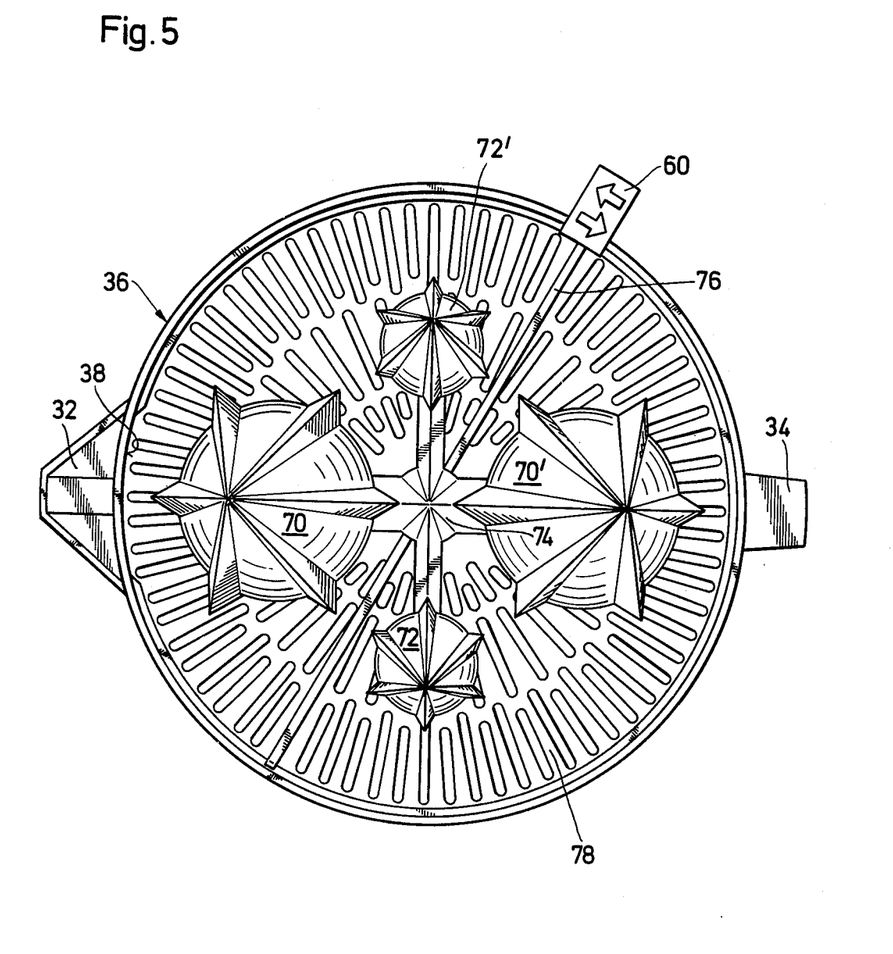
FIG. 5 is a plan view similar to FIG. 4 of an embodiment with two pairs of cones.

The embodiment of FIG. 5 differs from the embodiments previously described in that here two pairs of conical squeezer members 70,70' and 72,72' are provided which rest on a base 74 common to both with a central support. The pair 70,70' is for oranges and grapefruit, and the pair 72,72' is intended for lemons, mandarin oranges and clementines. There are no stops provided here for the cleaning element 76. The flesh of the fruit reaching the strainer base is, on the contrary, "swept" into the sectors not in use in each case.

Figure 6:
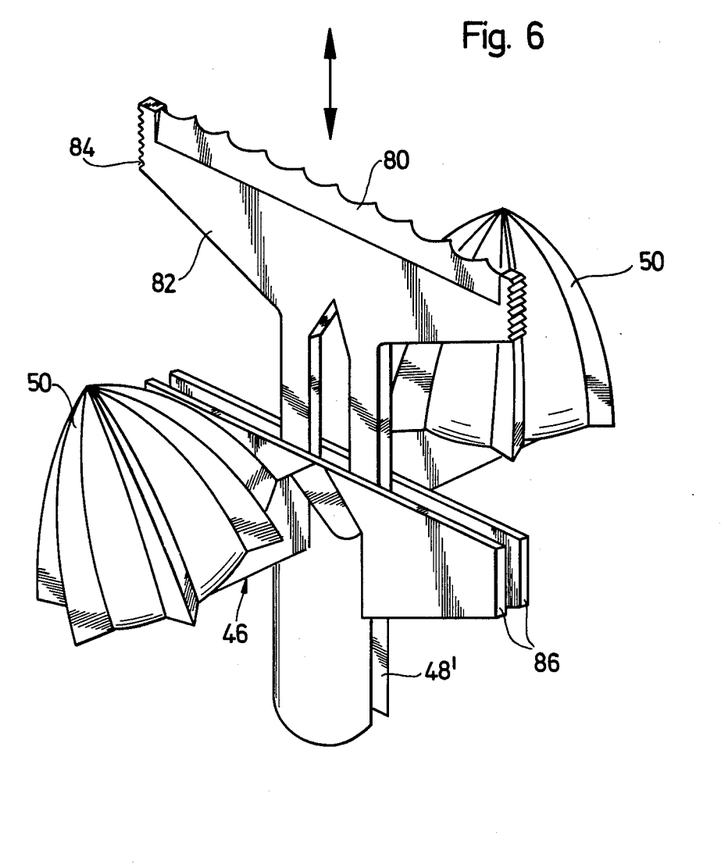
FIG. 6 shows an additional device which may be provided, for example, with the embodiment of FIGS. 3 and 4.

Since hand-operated squeezers constructed in accordance with the invention provide the opportunity to extract the juice from two halves of a piece of fruit simultaneously, it is advantageous to provide the squeezer itself with an instrument with which the fruit can be cut in half. FIG. 6 shows schematically how this can occur, for instance, in the case of a squeezer according to FIGS. 3 and 4. A cutting edge 80 rests horizontally between the two cones 50 and extends into the plane of symmetry of the double cone member 46. The cutting edge 80 is held by a plastics carrier 82 which may be pulled vertically out of the base 48 and which may be locked in the pulled-out position by locking elements (not shown). When using the squeezer, the user holds the piece of fruit with both hands and cuts it by moving it relative to the cutting edge 80, after which squeezing is effected immediately on the cones 50 without it being necessary to let go of the halves of the piece of fruit. The juice escaping as the piece of fruit is cut in half (in the case of ripe fruit this is a not inconsiderable amount) is not lost, but passes into the dish as well. The cutting edge 80 is lowered again for storage purposes wherein the milled edges 84 facilitate manipulation. The protective plates 86 prevent the user from being injured on the otherwise exposed cutting edge 80.

Figure 7:
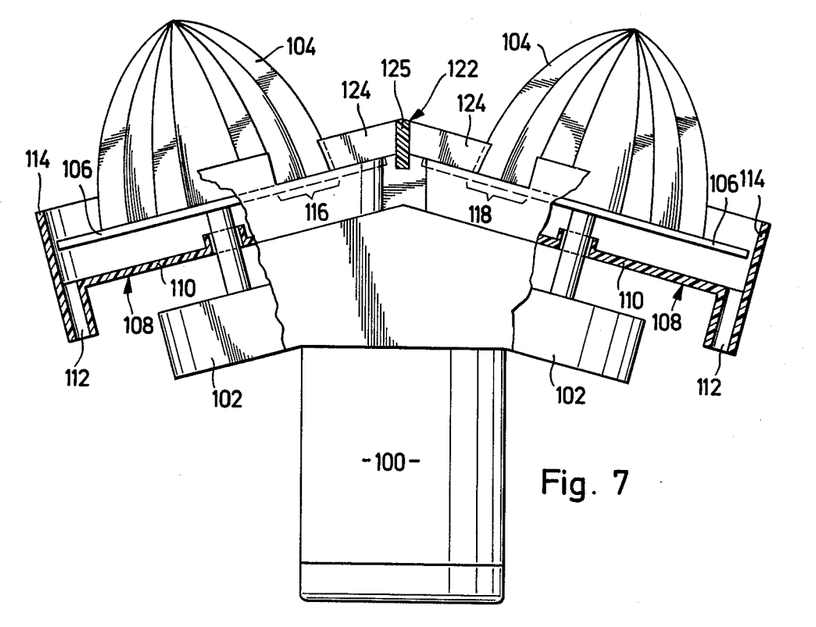
FIG. 7 illustrates a side view of a motor-driven, hand-operated squeezer wherein parts are broken away and others are shown in section.
Figure 8:
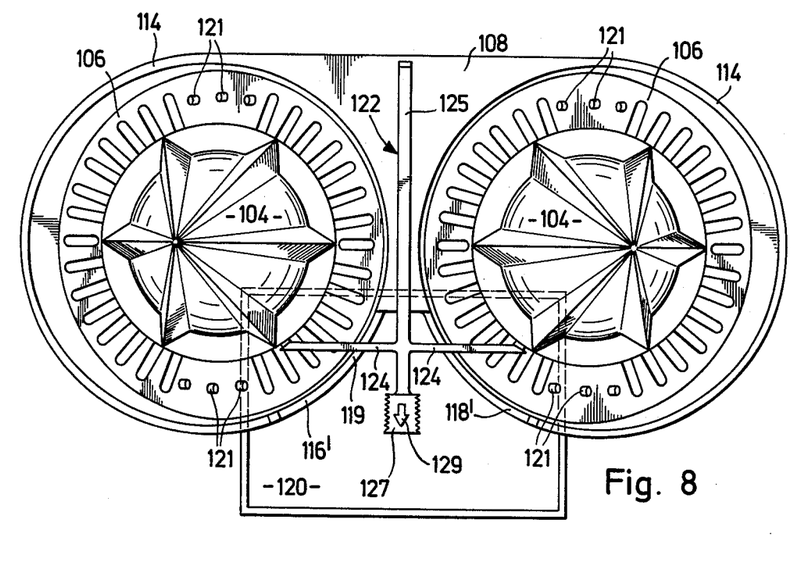
FIG. 8 is a plan view of the hand-operated squeezer similar to that of FIG. 7.

FIGS. 7 and 8 show motor-driven, hand-operated squeezers each of which incorporates a pair of squeezer members. A motor 100, in general an electric motor driven by mains electricity, drives two cones 104 via a gear unit 102 in opposite directions. The cones 104 are each integral with a respective strainer 106 which rotates with its cone. Beneath the cones 104 there is a housing 108 whose base 110 is parallel to the strainers 106. Since here the cones 104 are again arranged at an angle (30°), the sections of the housing base 110 beneath the strainers are at an angle of 15° to the horizontal. At the lowest point of both bases 110 there is an outlet 112. (The drawing is only diagrammatic. In practice, the two bases 110 converge to an outlet 112 common to both, beneath which there is arranged a collecting vessel for the juice.)

According to FIG. 7, right round the strainer 106, the housing 108 is provided with an upturned rim 114 which is interrupted at two points, namely at 116 for the left-hand cone and at 118 for the right-hand cone. In the area of these breaks, the upper edge of the housing 108 is approximately flush with the upper edge of the strainer 106 rotating behind it. According to FIG. 8 however, even though it is only a low one, a rim 119 is left in the area of the openings 116', 118', which prevents juice from flowing away, but nevertheless permits the waste flesh to be removed since this is taken round by means of nubs 121 on the strainers 106. Through the breaks or openings 116, 118 or 116', 118' the flesh of the fruit accumulating on the strainer 106 is conveyed outwards into a waste container 120, for which purpose there is provided a stationary cleaning element 122 which engages above the strainers 106. The flesh of the fruit taken round by the rotating strainers 106 piles up in front of the bars 124 of the cleaning element 122, a slight pressure being exerted which squeezes out the juice still contained in the fruit flesh. The fairly dry flesh finally crumbles, when sufficient has piled up, into the waste container 120.

In the embodiment of FIG. 7, the cleaning element 122 is simply placed on the device. According to FIG. 8 however, it is provided with a guide bar 125 and a grip 127 so that it may be moved in the direction of the arrow 129, in order after the operation has finished to completely push the waste flesh downwards and to make it possible to remove the assembly of the housing 108, the cones 104 and the strainers 106. For this purpose, a wedge or the like (not shown) may be provided on the guide bar 125, which lifts up the cones 104 when pulled in the direction of the arrow 129.

It is apparent that the embodiment is especially suited to commercial use since the juice extraction process need be interrupted only, and then for only a short time, when the waste container 120 is full. Operation can be carried out here effectively twice as fast as it can be effected with a conventional one-cone hand-operated squeezer, which in addition has to be cleaned from time to time, this cleaning often involving complicated manipulations. Compared with this, the increase in price for the manufacture of the parts of the squeezer consisting essentially (with the exception of the motor) of plastics, is insignificant.

Figure 9:
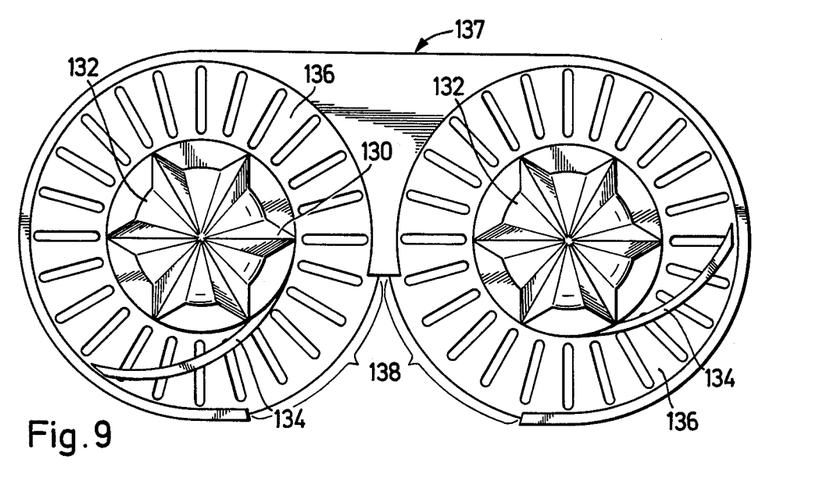
FIGS. 9 and 10 are plan views of variations of the embodiments of motor-driven, hand-operated squeezers.
Figure 10:
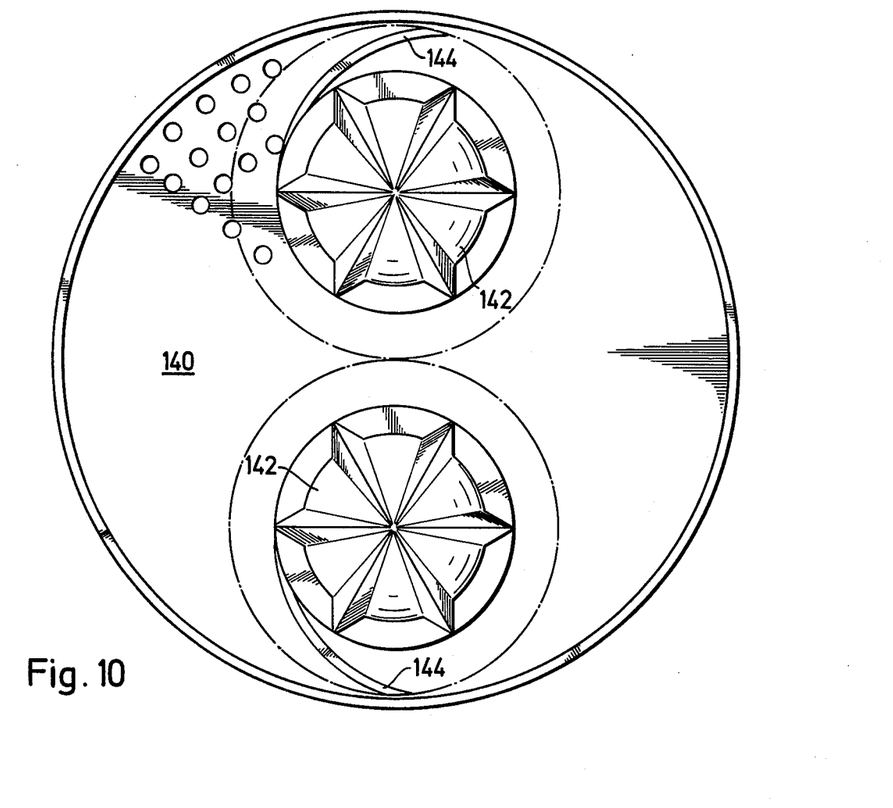

FIGS. 9 and 10 show schematically in plan view the construction of other motor-driven hand-operated squeezers constructed in accordance with the invention. In the squeezer of FIG. 9 the two axes of the two cones 132 are parallel. Ribs 130 formed on each of the cones 132 do not extend as far as the root line of their cone, but terminate before this point, so that the base surface of the cones is circular. At this point cleaning elements 134 rest on the cones 132 and rotate with them, whereas strainers 136 are stationary together with a housing 137. If desired the strainers 130 and the housing 137 are constructed in one piece. Here too, rim openings 138 are provided in the housing 137 and the waste fruit flesh carried round by the cleaning elements 134 is pushed outwards through the openings 138 into a waste container, in a manner similar to that described above for FIGS. 7 and 8.

The embodiment of FIG. 10 has elements of FIG. 9 and FIG. 4. Similar to FIG. 9, the strainer 140 is stationary and the cones 142 carry cleaning elements 144 which rotate with the cones. The waste flesh here is not, however, thrown out of the strainer 140, but accumulates in the strainer areas outside the points beneath the cones 142 where the juice runs down.

Figure 11:
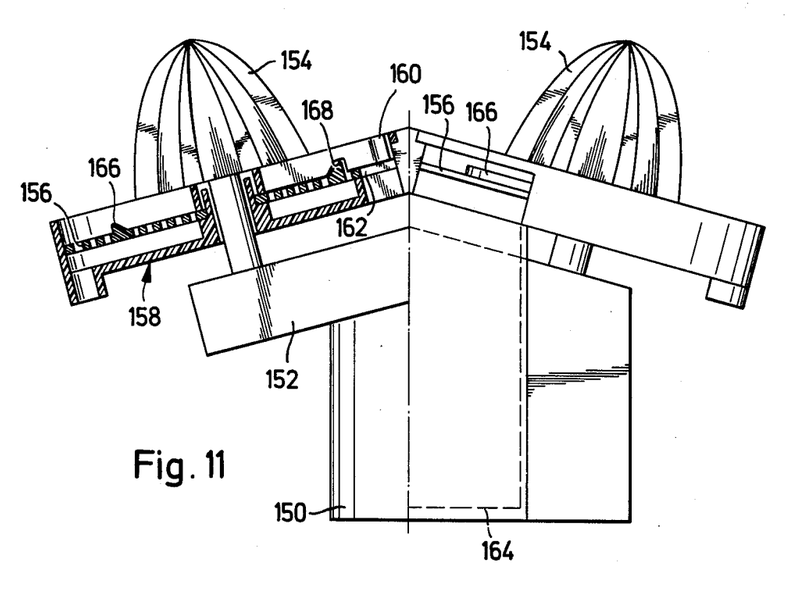
FIGS. 11 and 12 show in side view and plan view respectively, a further embodiment of a motor-driven, hand-operated squeezer.
Figure 12:
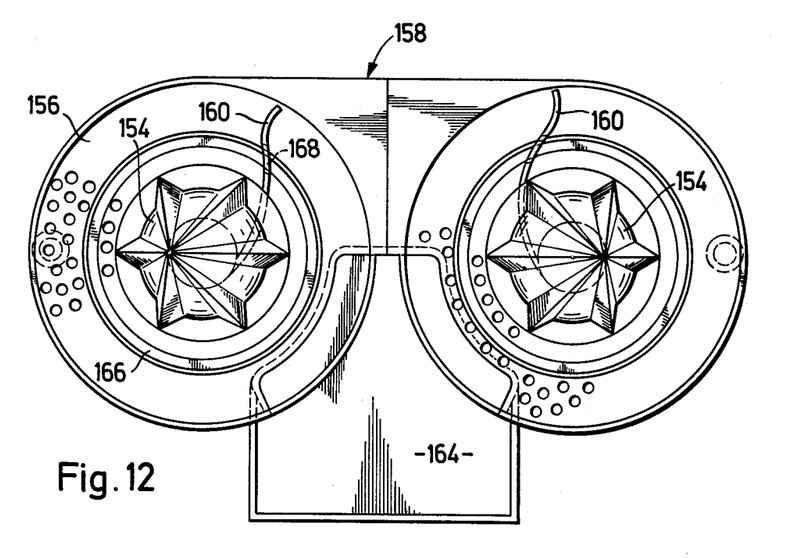

In the embodiment of FIGS. 11 and 12, a motor 150 drives, via gear unit 152, only the cones 154, whereas the strainers 156 and the housing 158 remain stationary. With each cone 154 there is associated a cleaning element 160 which likewise rotates with its cone. It conveys the flesh of the fruit outwards into an opening 162 in the base above a waste container 164, whilst the juice is retained by a low rim 166 on the strainer 156. The cleaning elements 160 each have a notch 168 complementary to the rim 166. When, as shown, a cleaning element 160 is directly joined to its cone 154, the rotational speed has to be relatively low. To operate quickly, such a low rotational speed is not adequate, but at about 100 rev/min. the cleaning element 160 would sweep the juice, together with the flesh of the fruit, into the waste container 164. For this reason, it is preferred either to let the cleaning elements 160 rotate more slowly than the cones 154 or to actuate them only intermittently.

Figure 13:
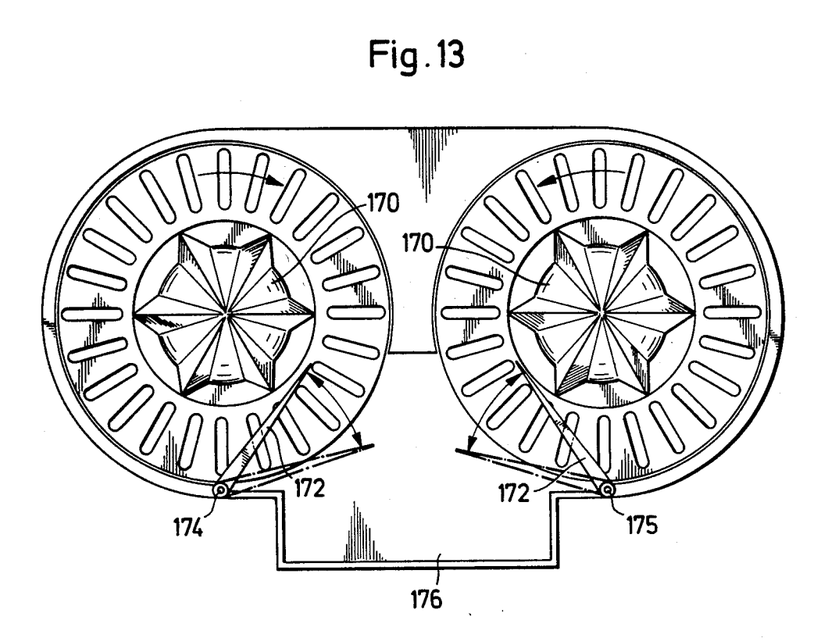
FIG. 13 shows a further embodiment in plan view.

The embodiment of FIG. 13 has motor-driven, cone/strainer members 170. The clearing away of the fruit flesh is effected here by flaps 172 which are pivotable about pivot bearings at 174 and 175, respectively. The swivel movement is carried out at intervals, the waste flesh accumulating in front of the flaps 172 being pushed into a container 176.

In all motor-driven squeezers, in which the axes of the cones are not parallel, but are at an angle, it is nevertheless possible simultaneously to pull off from the gear output shafts the assembly of the housing, the cones and the strainers for cleaning purposes, if a hinge in the shafts, a universal joint, conical plug connections or the like are provided, all known per se.

What I claim is:

1. A hand-operated squeezer for the extraction of juice from citrus fruits, the squeezer comprising at least one pair of substantially upright, but oppositely inclined and generally conical squeezer members of the same size and shape and having inclined axes converging on each other in a downward direction, wherein the squeezer members are so arranged with respect to one another that they may be used for the simultaneous squeezing with both hands of fruit halves of approximately the same size with approximately the same expenditure of force and time, the forces occurring upon simultaneous squeezing of two fruit halves on the two squeezer members substantially cancelling each other out.

2. A hand-operated squeezer as claimed in claim 1, comprising two squeezer member pairs, the members of each pair being of different sizes for use with different sized pieces of fruit.

3. A hand-operated squeezer as claimed in claim 1, wherein the pair of squeezer members are arranged with their axes lying in a common upright plane with the tips of the cones pointing away from each other.

4. A hand-operated squeezer as claimed in claim 1, wherein the axes of the squeezer members are arranged in a common plane which is vertical when the squeezer is in use, and together form an angle of from 0° to 90°, the tips of the cones pointing away from the apex of the angle.

5. A hand-operated squeezer as claimed in claim 4, wherein said angle between the inclined axes is approximately 30°.

6. A hand-operated squeezer as claimed in claim 1, wherein the squeezer members are arranged on a common base which is secured to a dish for collecting the squeezed-out juice.

7. A hand-operated squeezer as claimed in claim 4, wherein the two squeezer members have a minimum distance between them which corresponds to the combined thickness of the skins of two citrus fruits.

8. A hand-operated squeezer as claimed in claim 1, wherein the two squeezer members of the or each pair are motor-driven at the same speed of revolution.

9. A hand-operated squeezer as claimed in claim 1, wherein a single strainer is associated with all the squeezer members, on which strainer the waste flesh torn away during the squeezing collects.

10. A hand-operated squeezer as claimed in claim 1, wherein a respective strainer is associated with each squeezer member of the or each pair on which strainers the waste flesh torn away during the squeezing collects.

11. A hand-operated squeezer as claimed in claim 9, further including at least one cleaning element to clear away the waste flesh from the out-flow area directly beneath each squeezer member.

12. A hand-operated squeezer as claimed in claim 11, wherein a single cleaning element is associated with all the squeezer members.

13. A hand-operated squeezer as claimed in claim 8, wherein a respective cleaning element is associated with each squeezer member and rotates with it.

14. A hand-operated squeezer as claimed in claim 8, wherein the strainers rotate together with the squeezer members.

15. A hand-operated squeezer as claimed in claim 1, wherein all the squeezer members are injection-moulded in one piece from plastics materials.

16. A hand-operated squeezer as claimed in claim 9, wherein all the squeezer members are constructed together with the strainer as a one-piece plastics part.

17. A hand-operated squeezer as claimed in claim 9, wherein all the squeezer members and the cleaning element are injection-moulded as a one-piece plastics part.

18. A hand-operated squeezer as claimed in claim 1, further including a device for halving the fruit.

19. A hand-operated squeezer as claimed in claim 18, wherein the device for halving the fruit comprises a cutting edge which may be lowered and which is arranged between the squeezer members of a pair.

20. A hand-operated squeezer as claimed in claim 11, wherein the cleaning element may be moved away from the area above the strainer.

21. A hand-operated squeezer as claimed in claim 14, wherein the squeezer members and strainers together with a housing, form an assembly which may be placed on a motor-gear unit part.

22. A hand-operated squeezer as claimed in claim 4, further including a transverse-axially detachable coupling between the gear unit output shafts and the squeezer members.

23. A hand-operated squeezer as claimed in claim 1, wherein each of the squeezer members is ribbed on its outer surface.

24. A citrus fruit squeezer for extraction of juice, comprising a pair of substantially upright and oppositely inclined generally conical squeezer members adjacent each other with downwardly convergent axes at about an angle of 30° with each other and lying in a vertical plane, wherein the squeezer members are so arranged with respect to one another that they may be used for the simultaneous squeezing with both hands of fruit halves of approximately the same size with approximately the same expediture of force and time, the forces occuring upon simultaneous squeezing of two fruit halves on the two squeezer members substantially cancelling each other out, a perforate strainer panel beneath the squeezer members and spaced downwardly therefrom, and a swingable cleaning member on the strainer panel and underlying the squeezer members to clear the panel of flesh from the citrus fruit and facilitate rapid draining of the juice through the panel.

25. The citrus fruit squeezer according to claim 25 and there being a pivot means located between the squeezer members and adjacent the panel, the swingable cleaning member being mounted on the pivot for rotatable oscillation beneath the squeezer members for clearing the flesh away from the squeezer members.

* * * * *

UNITED STATES PATENT AND TRADEMARK OFFICE
CERTIFICATE OF CORRECTION

PATENT NO. : 4,106,401
DATED : August 15, 1978
INVENTOR(S) : Peter Ackeret

It is certified that error appears in the above-identified patent and that said Letters Patent are hereby corrected as shown below:

In claim 25, line 1, after "claim", delete "25" and substitute --24--.

Signed and Sealed this

First Day of May 1979

[SEAL]

Attest:

RUTH C. MASON
Attesting Officer

DONALD W. BANNER
Commissioner of Patents and Trademarks